United States Patent [19]

Grosspietsch et al.

[11] Patent Number: 5,062,513
[45] Date of Patent: Nov. 5, 1991

[54] HUB GUIDANCE FOR FRICTION CLUTCH

[75] Inventors: Wolfgang Grosspietsch, Schweinfurt; Erich Scheer, Posselsheim, both of Fed. Rep. of Germany

[73] Assignee: Fichtel & Sachs AG, Fed. Rep. of Germany

[21] Appl. No.: 431,739

[22] Filed: Nov. 3, 1989

[30] Foreign Application Priority Data

Nov. 11, 1988 [DE] Fed. Rep. of Germany ....... 3838306
May 24, 1989 [DE] Fed. Rep. of Germany ....... 3916853

[51] Int. Cl.⁵ ...................... F16D 13/50; F16D 13/58
[52] U.S. Cl. ............................ 192/70.17; 192/70.27; 192/110 B
[58] Field of Search ............... 192/70.27, 110 B, 89 B, 192/70.17

[56] References Cited

U.S. PATENT DOCUMENTS

| 1,742,805 | 1/1930 | Carhart | 192/70.27 X |
| 2,009,507 | 7/1935 | Matthews | 192/70.27 X |
| 2,020,637 | 11/1935 | Fawick | 192/89 B X |
| 2,060,692 | 11/1936 | Rockwell | 192/70.27 X |
| 2,171,829 | 9/1939 | Haupt | 192/70.27 X |
| 2,700,444 | 1/1955 | Ahlen | 192/89 B X |

FOREIGN PATENT DOCUMENTS

| 7127710 | 3/1973 | Fed. Rep. of Germany . | |
| 3343505 | 6/1985 | Fed. Rep. of Germany . | |
| 3412961 | 10/1985 | Fed. Rep. of Germany . | |
| 46911 | 5/1939 | Netherlands | 192/70.27 |
| 491675 | 9/1938 | United Kingdom . | |
| 495887 | 11/1938 | United Kingdom . | |
| 1115729 | 5/1968 | United Kingdom . | |
| 1256989 | 12/1971 | United Kingdom . | |
| 2160295 | 12/1985 | United Kingdom . | |

Primary Examiner—Rodney H. Bonck
Attorney, Agent, or Firm—Toren, McGeady & Associates

[57] ABSTRACT

The invention relates to the guidance of the hub (23) of a clutch disc (13) of a friction clutch (1), independently of the splining (27) of the gear shaft (29). The guidance of the clutch disc (13) takes place through a bearing (41) which supports itself for the one part on the hub (23) of the clutch disc (13) and for the other part on a component of the friction clutch (1). Due to this arrangement a satisfactory centering of the clutch disc (13) is guaranteed, the pilot bearing for the guidance of the gear shaft can be eliminated and the fitting of clutch and gear on the internal combustion engine is substantially facilitated.

9 Claims, 9 Drawing Sheets

HUB GUIDANCE FOR FRICTION CLUTCH

BACKGROUND OF THE INVENTION

The invention relates to a friction clutch in the drive line of a motor vehicle between internal combustion engine and gear, and especially a friction clutch consisting of a fly-wheel in rotational connection with the crank-shaft and rotatable about an axis of rotation, having a friction face, a clutch cover secured on the fly-wheel, a presser plate arranged in the clutch cover with a friction face facing the friction face of the fly-wheel and secured non-rotatably but axially displaceably on the clutch cover, a clutch main spring which initially stresses the presser plate in the direction towards the fly-wheel, a clutch disc with friction linings which is clampable in between the two friction faces and comprises a hub with internal splining for setting non-rotatably upon the external toothing of a gear shaft and release elements for the axial displacement of the presser plate against the force of the clutch main spring.

Friction clutches of the above-stated construction type are known in manifold forms. Reference may be made by way of example to German Utility Model No. 7,127,710 and to German Patent Applications 3,343,505 and 3,412,961. In these known friction clutches the clutch discs are guided and centered on the gear shaft by means of their internal splining, while the gear shaft for its part carries on its end protruding from the gear a cylindrical journal which is guided in a pilot bearing. The pilot bearing can be arranged either in a bore of the crank-shaft or in a bore of the fly-wheel.

In these known designs the expense in the fitting of gear and internal combustion engine is disadvantageous, where the clutch disc must be pre-centered during clutch assembly by means of an externally toothed mandrel guided in the pilot bearing, and the mandrel has to be removed later. The centering by means of the mandrel is affected by a radial play which subsequently renders assembly difficult, since the gear input shaft must be introduced both into the pilot bearing and into the splining of the clutch disc, in fact more or less blindly.

The present invention shows a way to simplify the assembly of the clutch, internal combustion engine and gearing and to achieve a better guidance of the clutch disc.

SUMMARY OF THE INVENTION

Due to the mounting of the clutch disc, effected independently of the gear shaft, the otherwise necessary manipulation with a mandrel is completely by-passed. Furthermore a satisfactory central arrangement of the clutch disc in relation to the axis of rotation is possible, so that unbalances present still in the clutch disc can no longer affect the gear shaft. Thus the pilot bearing can be eliminated and thus in the assembling not only the advantage of a clutch disc which is already centered exactly but also in addition the advantage that the gear shaft only has to be introduced into the splining of the hub of the clutch disc, and no longer into the pilot bearing therebehind, is gained.

The bearing can here be arranged between the hub and a bearing carrier secured on the fly-wheel. Thus a construction is possible which is space-saving especially in the axial direction.

It is however also possible for the radially inner region of the fly-wheel to be formed as bearing carrier, so that a separate component can be eliminated.

It is however also readily possible to arrange the bearing between the hub and the clutch cover or a component firmly connected with the clutch cover. Such a formation simplifies assembly in that the clutch disc and the pressure plate unit, consisting of the clutch cover, the presser plate and the clutch main spring, can be fitted all together in one operation.

The same advantages can be realised if the bearing is arranged between the hub of the clutch disc and a radially inwardly prolonged region of the presser plate.

A likewise constructionally very simple embodiment can be achieved in that a central screw connection is provided between crank-shaft and fly-wheel and a part of this screw element, together with the clutch disc hub, which is made prolonged in the direction towards the crank-shaft, forms a bearing.

An arrangement of this bearing between the housing of the friction clutch and the hub of the clutch disc can be realised in a truly simple manner if the presser plate penetrates the clutch cover on the side remote from the crank-shaft at several points on the periphery in corresponding openings and the release elements and/or the clutch main spring are arranged on the outside of the clutch cover and the clutch cover is prolonged in its radially inwardly facing region and provided with a collar which, together with the hub and a bearing ring, forms the bearing. Such a construction renders possible a simple assembly of the pressure plate unit and the clutch disc in one operation.

It is however also possible in the case of a form of clutch construction with support elements arranged in distribution on the circumference of the housing, for the arrangement of release elements or of a diaphragm spring, to provide a bearing carrier which is secured on the support elements, which proceeds radially inwards and comprises a collar in the direction towards the crank-shaft, and the collar, together with the hub of the clutch disc, with interposition of a bearing race ring, forms a bearing.

The bearing race ring used in all these cases can naturally also be made in the form of a rolling bearing. In the case of a fixed arrangement of this bearing ring in the internal diameter of a bearing carrier which is secured to the clutch cover, or of a presser plate forming the bearing carrier, an especially practical form of embodiment can be achieved in that an axial catch is provided between bearing race ring and hub of the clutch disc, which catch joins the pressure plate unit and the clutch disc together into a non-losable unit, so that the two parts can be despatched and also secured in one operation to the fly-wheel in the pre-assembled condition, without loss of the centering of the clutch disc. Here it is merely to be ensured that the axial catch possesses a specific axial interval corresponding at least to the wear distance of the clutch disc or the clearance distance of the presser plate.

Especially when synthetic plastics material is used as material for a bearing race ring, elastic tongues pointing in the direction towards the gear can be provided on the race ring, which tongues are provided with radially inwardly pointing noses and engage in a corresponding groove in the external circumference of the hub. If in this case both the noses and the end of the hub are provided with corresponding oblique faces, then the clutch disc with its hub can be introduced easily into the internal diameter of the bearing race ring and the noses can be brought easily to snap into the groove.

In the case of a friction clutch which is part of what is called a two-mass fly-wheel, the bearing plate which carries on its external circumference the bearing for the limited rotatability of the two parts of the two-mass fly-wheel can be used as bearing carrier for the hub of the clutch disc. Thus the axial space required by this bearing between the two fly-wheel masses can be used at the same time for the bearing between the hub of the clutch disc and the fly-wheel.

If in the case of a two-mass fly-wheel a central screw connection is used between the crank-shaft and the first fly-wheel, then the bearing plate which carries the bearing for the rotation of the two fly-wheel masses in relation to one another can serve at the same time together with the hub of the clutch disc as bearing for the guidance of the clutch disc. In such a case very much radial construction space is saved and the use of a relatively small bearing is rendered possible, if the collar facing axially away from the bearing plate comprises directly on its internal diameter the bearing race ring for the bearing mounting of the hub of the clutch disc. Thus construction space is gained in the radial direction for the accommodation of the torsion spring equipment and possibly the friction devices.

The formation of the bearing as an axially directed collar of a bearing carrier or inner regions of the fly-wheel in combination with the external diameter of the hub, with interposition of a bearing ring, renders possible a very simple and effective centring of the clutch disc while avoiding a pivot bearing, and thus a considerable simplification in the assembly of fly-wheel, pressure plate unit, clutch plate and gear. In that case the bearing race ring can also be formed by an anti-friction bearing.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE PREFERRED EMBODIMENTS

Figure 1:
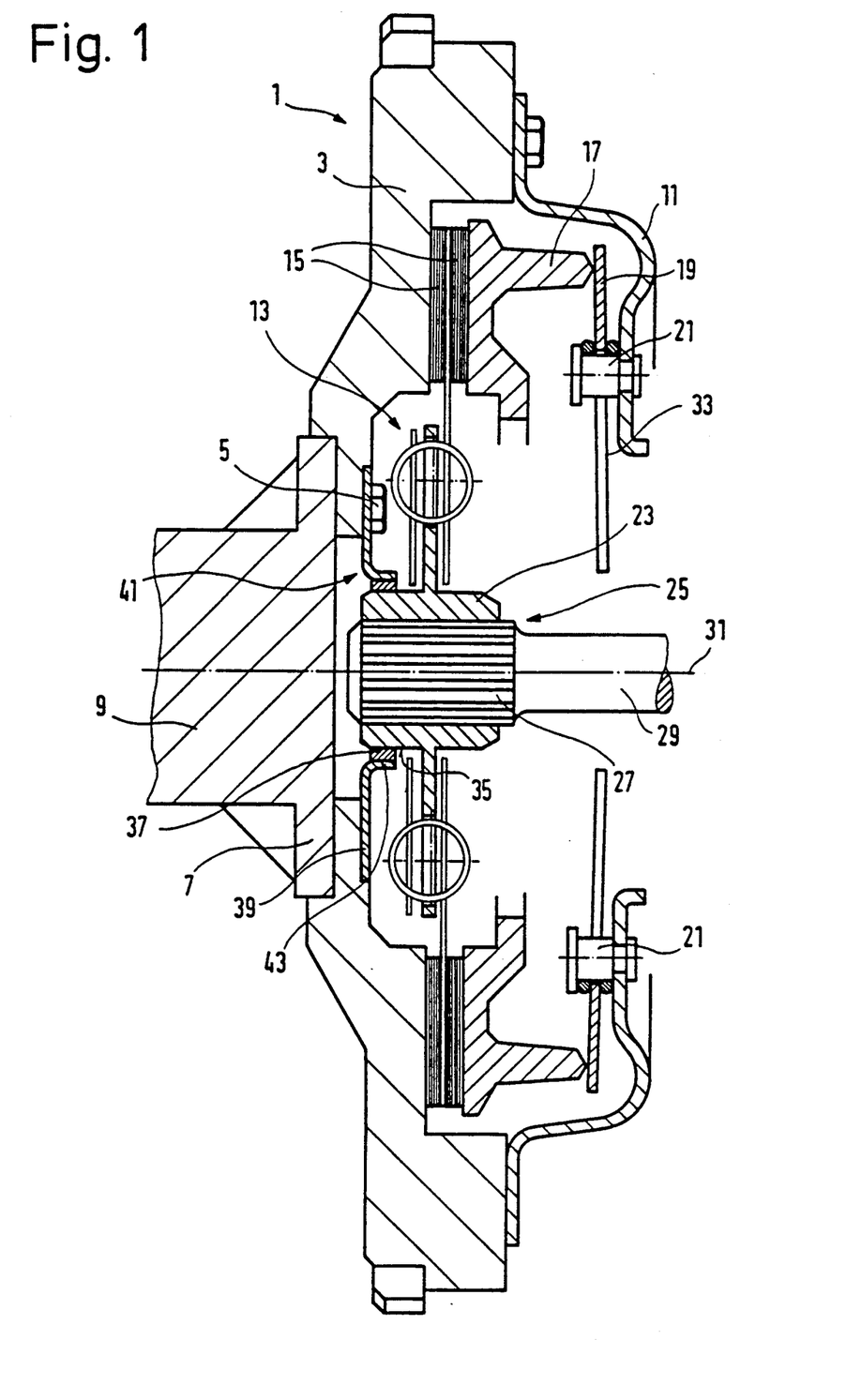
FIG. 1 shows the longitudinal section through a friction clutch with a bearing carrier screwed to the fly-wheel.

In FIG. 1 there is reproduced the longitudinal section of a friction clutch 1 in which a fly-wheel 3 is screwed by means of several screws 5, arranged on a mean diameter, to a flange 7 of a crank-shaft 9. This style of fastening of a fly-wheel is widespread. A clutch cover 11 is secured to the fly-wheel 3 and a clutch disc 13 with its friction linings 15, a presser plate 17 and a diaphragm spring 19 are arranged between the fly-wheel 3 and the clutch cover 11. The diaphragm spring 19 is mounted pivotably by means of several distance bolts 21 arranged fixedly on the circumference of the clutch cover 11 and, when the friction clutch is in the engaged condition, loads the presser plate 17 by its own tension in the direction towards the fly-wheel 3, whereby the friction linings 15 of the clutch disc 13 are connected, due to the frictional engagement, fast in rotation with the fly-wheel 3 and the crank-shaft 9. The presser plate 17 is here arranged in known manner non-rotatably but axially displaceably on the clutch cover 1. The clutch disc 13 has a hub 23 which is set with its internal splining 25 non-rotatably but axially displaceably upon an external splining 27 of a gear shaft 29. The gear shaft 29 extends, pointing away from the crank-shaft 9, into a gear (not shown). All components are arranged rotatably about a common axis 31 of rotation. If the tongues of the diaphragm spring 19 arranged at 33, are pressed by means of a clutch releaser (not further illustrated) towards the fly-wheel 3, the presser plate 17 is relieved of load and the clutch 1 is disengaged.

The hub 23 of the clutch disc 13 is provided in its region directed towards the crank-shaft 9 with a cylindrical outer jacket 35, and together with a bearing race ring 37, arranged there, and a bearing carrier 39, forms a bearing 41. In that case the bearing carrier 39 is made as a sheet metal part, held by the already present securing screws 5 between fly-wheel 3 and crank-shaft 9 and provided in its radially inner region with a collar 43 facing away from the crank-shaft 9. Between the inner jacket of this collar 43 and the outer jacket 35 of the hub 23 the bearing race ring 37 is arranged. It can be made either as plain bearing or as anti-friction or other bearing The bearing 41 substantially simplifies the fitting of the pressure plate unit 11, 17, 19 on the fly-wheel 3 and of the gear on the internal combustion engine. In conventional clutches ordinarily during the fitting of gear and internal combustion engine the clutch disc 13 is fixed by way of its internal splining 25 by means of a mandrel in relation to the rotation axis 31, in that an extension of the mandrel reaches into the pilot bearing, which is otherwise usually present. Then the fitting of the pressure plate unit, consisting of the clutch cover 11, the diaphragm spring 19 and the presser plate 17, takes place. After the fitting of the pressure plate unit the clutch disc 13 is clamped in by the force of the diaphragm spring 19, in the region of its friction linings 15, between the presser plate 17 and the fly-wheel 3, so that the centering mandrel can be removed. Then the fitting of gear and internal combustion engine can take place in that the gear is screwed, with the external splining 27 of the gear shaft 29 leading, to the internal combustion engine, in which according to the prior art the external splining 27 must be introduced into the internal splining 25 of the hub 23 and thereupon the journal of the gear shaft 29 must be introduced into the pilot bearing. Monitoring of this action is not possible since the gear covers the clutch with its housing surrounding the clutch. The centering mandrel necessary for the pre-adjustment of the clutch disc is affected by tolerances both in relation to the pilot bearing and in relation to the internal toothing 25 of the hub 23, so that the pre-centering of the clutch disc 13 is not always satisfactorily present.

In departure therefrom in the case of a construction according to FIG. 1 firstly the clutch disc 13 is laid into the fly-wheel 3, whereby satisfactory centring results through the bearing 41. The tolerances for this bearing 41 can with simple means be kept substantially closer than is possible in the prior art. The fitting of the pressure plate unit and of the gear then takes place. Apart from the simplified assembly this separate mounting of the hub 23 results in a substantially more exact guidance, due to which any unbalance of the clutch disc 13 also has substantially less effect. This bearing mounting ensures by way of example a substantially better clearance behaviour of the clutch disc 13 when the clutch is disengaged, since the guidance of the hub 23 takes place in the bearing 41 and not on the external splining 27 of the gear shaft 29 the latter here serves now only for torque transmission.

Variants of the friction clutch according to FIG. 1 will be described hereinafter. Components of like effect are provided with the reference numerals according to FIG. 1, and with a letter for distinction. Reference is made to the description of FIG. 1 for explanation.

Figure 2:
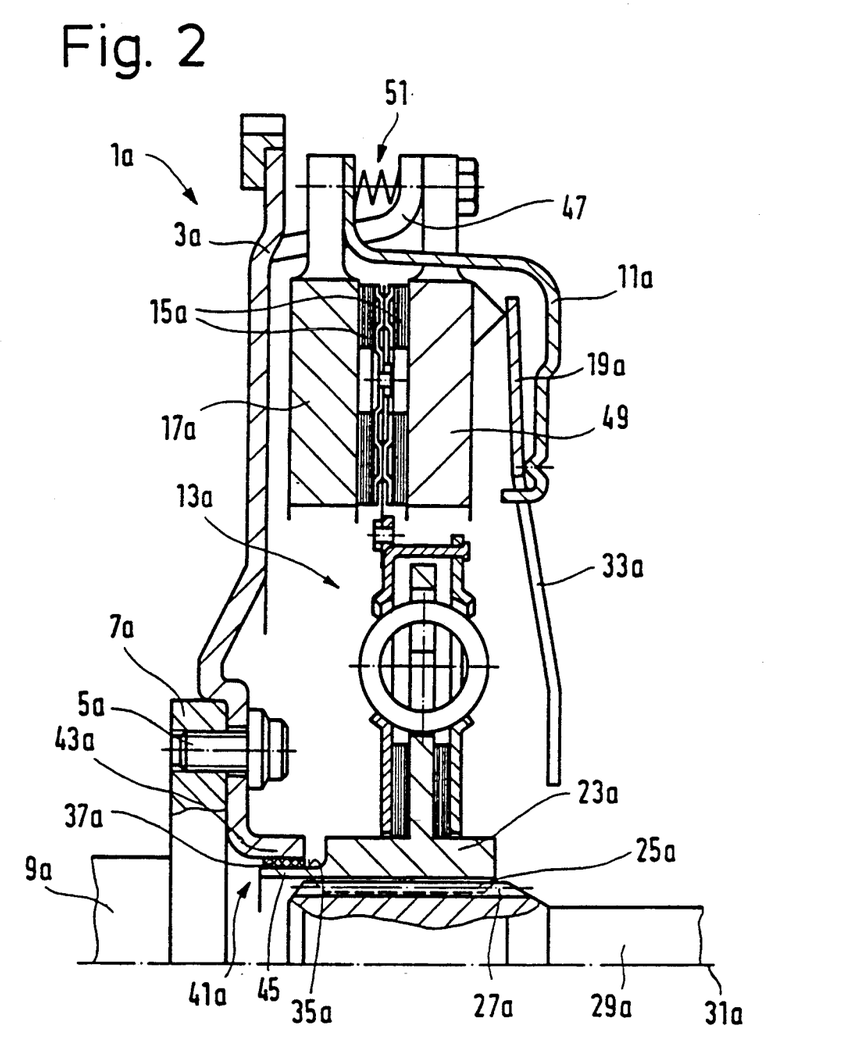
FIG. 2 shows the upper half of a longitudinal section of a friction clutch with a sheet metal part as fly-wheel, which is formed directly as bearing carrier.

In the section in FIG. 2 a somewhat different design of a friction clutch 1a is represented, where admittedly the style of the bearing mounting of the hub 23a of the clutch disc 13a does not differ substantially from FIG. 1. In the present case the fly-wheel 3a consists of a thick-walled sheet metal part which is set upon the flange 7a of the crank-shaft 9a and screwed with screws 5a. The fly-wheel 3a is prolonged radially inwards in the direction towards the rotation axis 31a and there comprises an integrally formed-on collar 43a pointing axially away from the crank-shaft 9a and serving as bearing carrier. On the inner surface of this collar 43a there is arranged the bearing race ring 37a which is set upon the outer face 35a of a prolonged region 45 of the hub 23. These parts form the bearing 41a for the clutch disc 13, which through the internal splining 25a of its hub 23a is in rotation-fast arrangement to the external splining 27a of the gear shaft 29a. According to the space conditions existing the prolonged region 45 of the hub 23a can be made prolonged in the direction towards the crank-shaft 9a or the bearing 41a can be set directly upon the outer jacket of the hub 23a in accordance with FIG. 1. This results in the same advantages as already listed under FIG. 1. The construction of the friction clutch 1a itself has no influence upon the bearing mounting of the hub 23a, however it will be described briefly next for the sake of completeness. The fly-wheel 3a is firmly connected with a presser plate 49 through arms 47, pointing away from the crank-shaft 9a. The clutch cover 11a grasps with several arms through corresponding openings of the presser plate 49 into the space between the presser plate and the fly-wheel 3a and there holds the axially displaceable presser plate 17a. Clearance springs 51 can be provided between the two presser plates 17a and 49. Between the clutch cover 11a and the presser plate 49 the diaphragm spring 19a is inserted which, due to its resilient supporting on the inside of the cover 11a and on the presser plate 49 initially stresses the presser plate 17a, by means of the clutch cover 11a in the direction towards the presser plate 49. Thus the friction linings 15a of the clutch disc 13a can be clamped in between the two presser plates 17a and 49. For the clearance of the friction clutch 1a the radially inwardly facing ends of the spring tongues 33a of the diaphragm spring 19a are moved by a release system (not shown) in the direction towards the crankshaft 9a, whereby the diaphragm spring 19a tips about its external circumference and moves the cover 11a with the presser plate 17a to the left. Thus the friction linings 15a of the clutch disc 13a can be brought out of frictional engagement.

Figure 3:
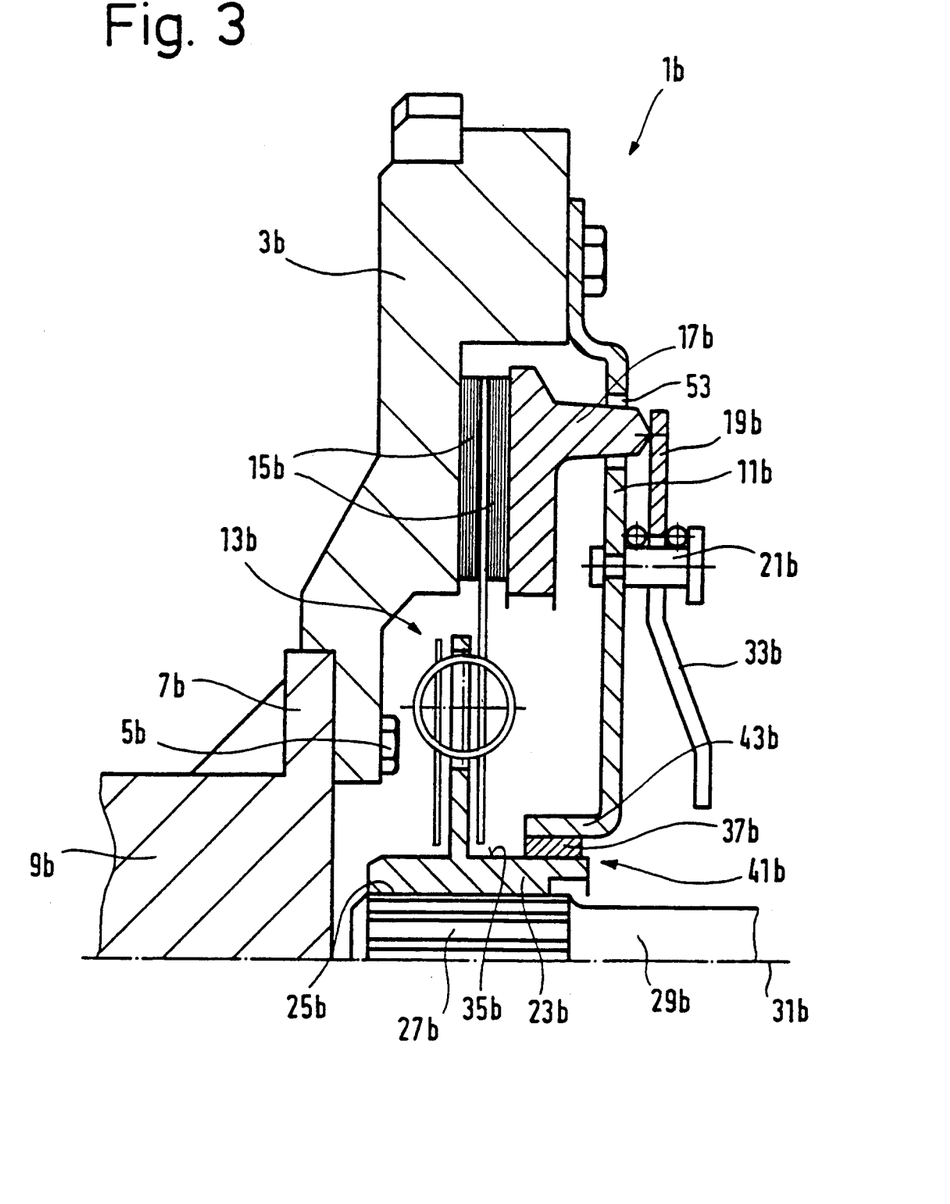
FIG. 3 shows a section through the upper half of a friction clutch, where the clutch cover serves as bearing carrier and the diaphragm spring is secured outside the clutch cover.

In FIG. 3 there is reproduced the longitudinal section of the upper half of a friction clutch 1b, in which the diaphragm spring 19b is arranged on the outer side of the clutch cover 11b through several circumferentially distributed distance bolts 21b. In the case of this arrangement the presser plate 17b penetrates the clutch cover 11b at several points in distribution in the circumferential direction, in appropriate openings 53, in order to produce a connection to the diaphragm spring 19b. The clutch cover 11b in the present case is integrally radially inwardly prolonged and provided with a collar 43b serving as bearing carrier, which faces in the direction towards the crank-shaft 9b. This collar 43b together with the outer jacket 35b of the hub 23b of the clutch disc 13b, and with a bearing race ring 37b forms the bearing 41b for the clutch disc 13b. The other components are arranged in accordance with FIG. 1. The arrangement of the bearing 41b at a position according to FIG. 3 has an additional advantage which consists in that in the assembling of pressure plate unit, clutch disc 13b and fly-wheel 3b the pressure plate unit can be installed in common with the clutch disc 13b as a construction unit on the fly-wheel 3b, since the bearing 41b is situated between a part of the pressure plate unit, namely the clutch cover 11b, and the hub 23b. Thus it is possible to treat the pressure plate unit and the clutch disc as a unit during the assembly operation on the fly-wheel, whereby the assembly operation is considerably simplified.

Figure 4:
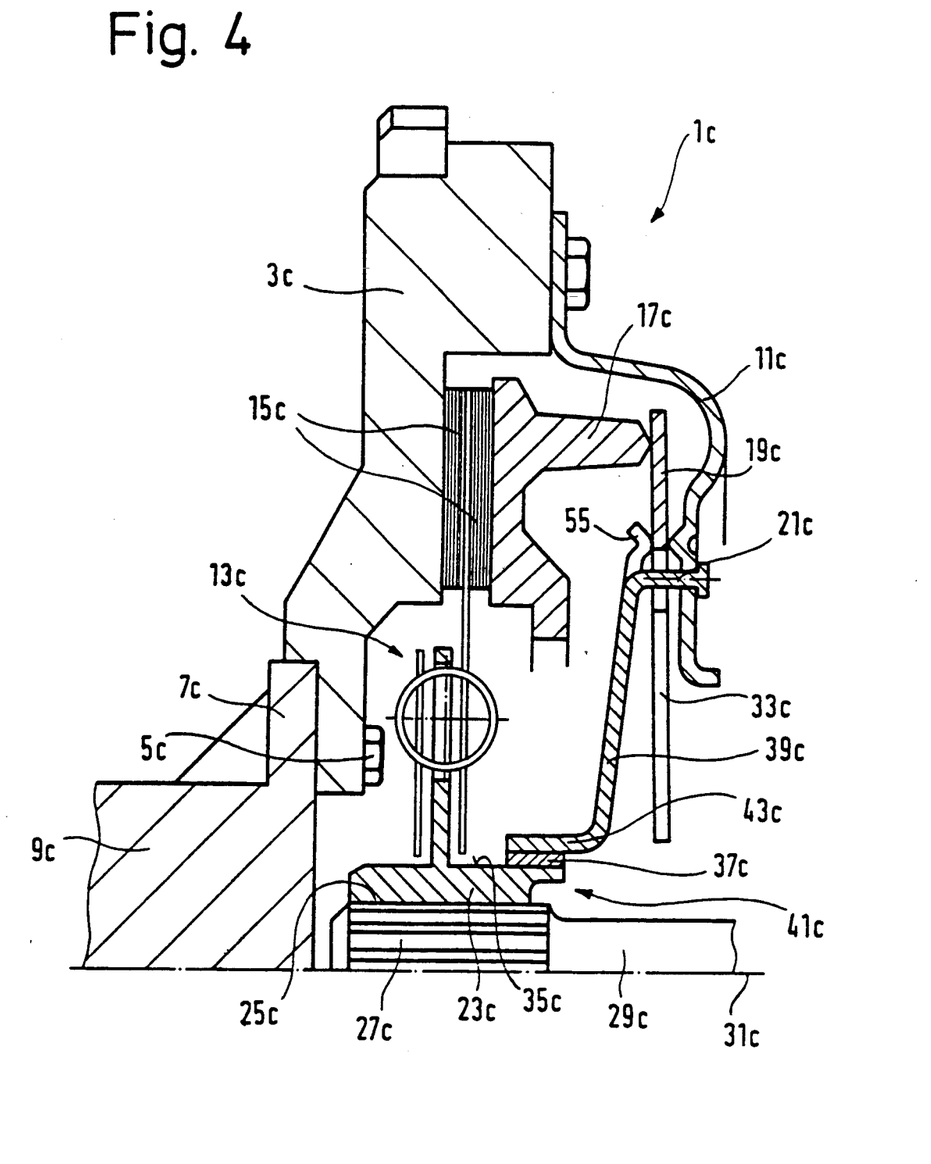
FIG. 4 shows a section through the upper half of a friction clutch where a component secured to the clutch cover serves as bearing carrier.
Figure 5:
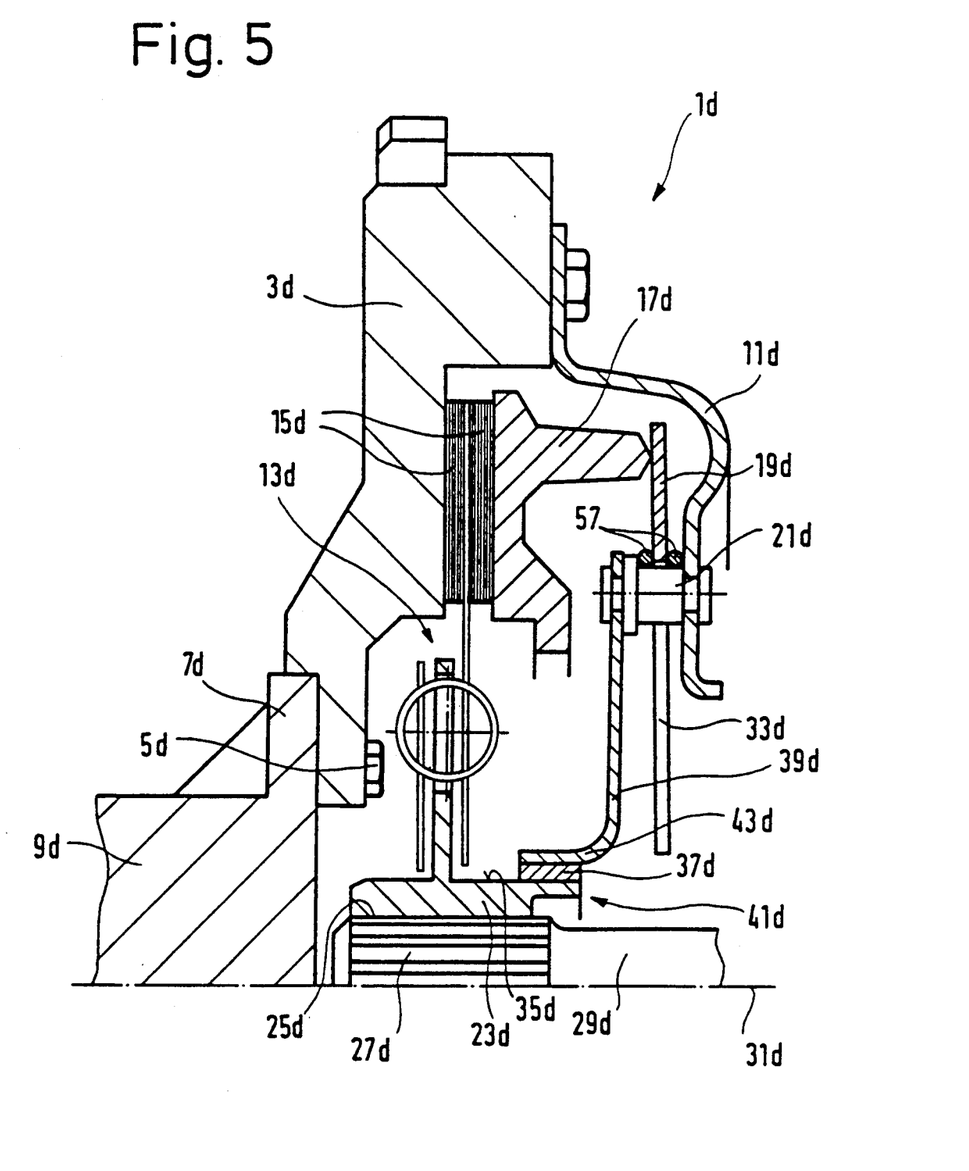
FIG. 5 shows a section through the upper half of a friction clutch with diaphragm spring guided by means of distance bolts, a component secured to the distance bolts forming the bearing carrier.

The clutches according to FIGS. 4 and 5 are variants of the clutch according to FIG. 3 with the same advantages. They differ merely in the construction of their pressure plate units. Thus in both the diaphragm spring 19c, 19d is again arranged within the clutch cover 11c, 11d and acts directly upon the presser plate 17c, 17d; in both the diaphragm spring 19c, 19d is centered and held axially on the clutch cover 11c, 11d by means of separate distance elements 21c, 21d, and in both cases on these separate distance elements 21, 21d a bearing carrier 39c and 39d respectively is fitted fast on the clutch cover 11c, 11d, which is prolonged radially inwards, comprises a collar 43c and 43d respectively extending in the direction towards the crank-shaft 9c, 9d, this collar 43c, 43d together with a bearing race ring 37c, 37d and the outer Jacket 35c, 35d of the hub 23c, 23d of the clutch disc 13c, 13d forming a bearing 41c, 41d for the clutch disc. Here in accordance with FIG. 4 the bearing carrier 43c is so formed at its external circumference that it comprises individual formed-on distance tabs 21c pointing axially away from the crank-shaft 9c, which tabs penetrate the diaphragm spring 19c in corresponding openings and are riveted with the clutch cover 11c. Furthermore the bearing carrier 43c circumferentially comprises retaining zones 55, between the distance tabs 49, for the support of the tilt circle of the diaphragm spring 19c. The similar construction according to FIG. 5 uses the known distance bolts 21d which are provided to each of the two sides with a wire ring 57 for the tilt circle support of the diaphragm spring 19d. The distance bolts 21d are connected, for example riveted, firmly with the bearing carrier 39d in the region towards the crank-shaft 9d.

The two constructions according to FIGS. 4 and 5 possess the same advantageous possibility of fitting in conformity with the construction according to FIG. 3.

Figure 6:
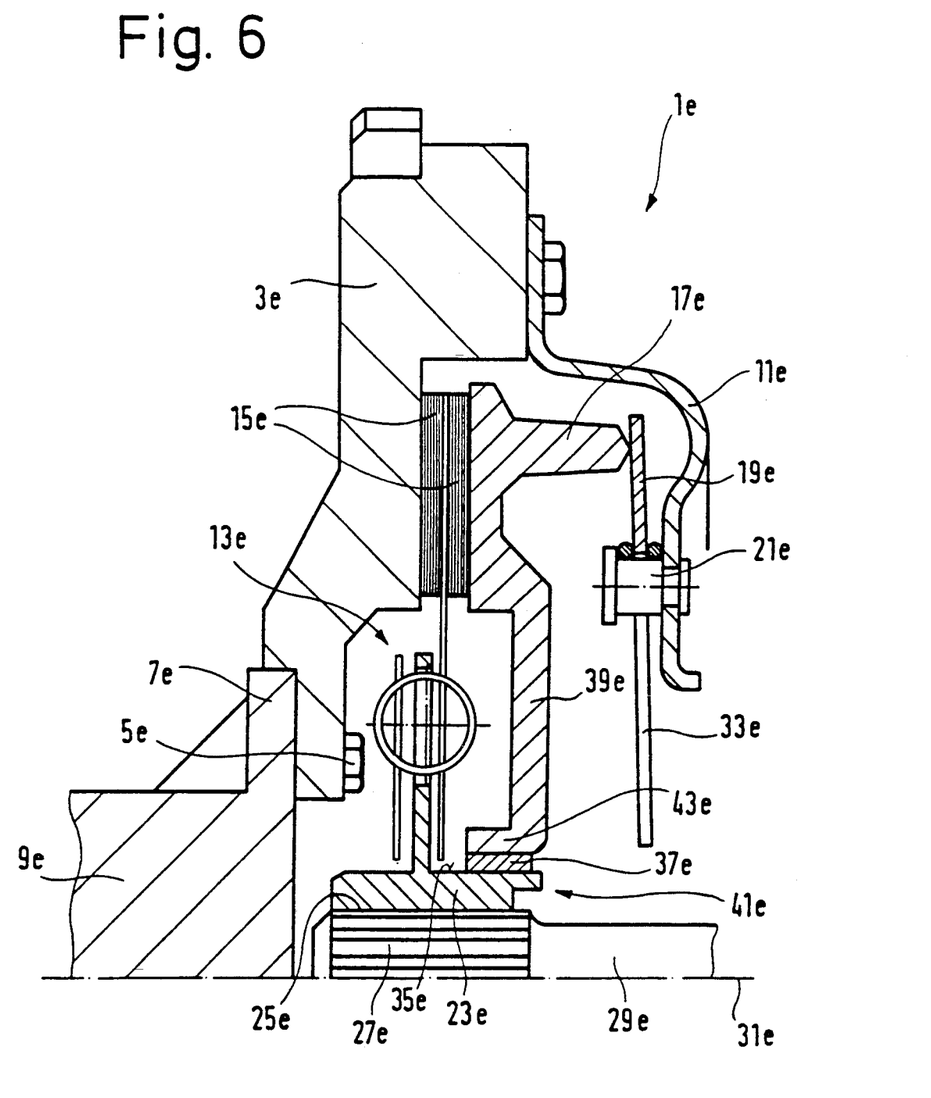
FIG. 6 shows the section through the upper half of a friction clutch in which the presser plate serves as bearing carrier.

The construction according to FIG. 6 differs somewhat from the constructions according to FIGS. 3 to 5 in as much as here the presser plate 17e forms the bearing carrier 39e. It is prolonged radially inwards and provided with an axially directed collar 43e which extends in the direction towards the crank-shaft 9e. Here it extends concentrically with a region of the hub 23e of the clutch disc 13e and forms, with interposition of the bearing race ring 37e, the bearing 41e for this clutch disc 13e. The other elements of the friction clutch 1e are known both in their construction and in their function. In this present case too the clutch disc 13e can be pre-assembled with the pressure plate unit, consisting of clutch cover 11e, diaphragm spring 19e and presser plate 17e, in that with its hub 23e it is introduced into the internal opening of the bearing race ring 37e and thus centered.

It would appear to be self-evident that the diaphragm spring as represented in the constructions hitherto can also be replaced by a dished spring or by several circumferentially distributed compression springs, the presser plate then being actuated by conventional release levers.

The fitting of pressure plate unit, clutch disc and fly-wheel of the constructions according to FIGS. 3 to 6 can be considerably simplified by further simple design development. For this purpose reference should be made to FIGS. 7 to 9. These three Figures show details, on an enlarged scale, of the bearing position between the hubs of the clutch disc and the corresponding bearing carriers, which are connected with the clutch cover or the presser plate.

Figure 7:
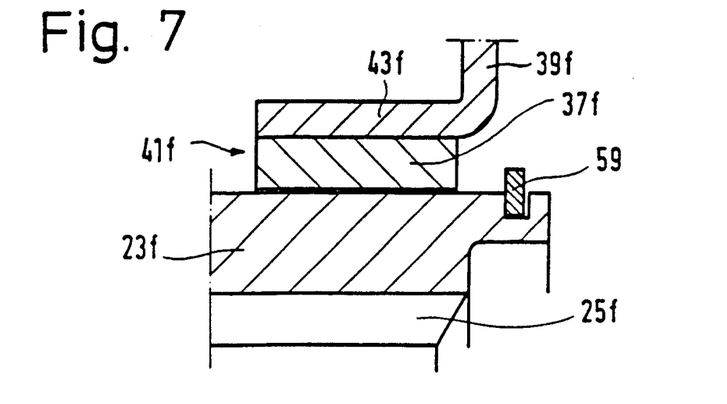
FIGS. 7 to 9 show enlarged representations of the bearing zone with an axial catch between hub and bearing carrier.

In FIG. 7 the bearing 41f is formed by the collar 43f of the bearing carrier 39f, the hub 23f and the bearing race ring 37f. The bearing race ring 37f is here pressed into the collar 43f and fixed axially there. The hub 23f is made longer, pointing away from the crank-shaft, than the axial extent of the bearing race ring 37f, and extends through the latter to the side of the gear. In this prolonged region the hub 23f has a securing ring 59 which, after the insertion of the clutch disc, is inserted into the pressure plate unit and prevents the clutch disc from falling axially out of the pressure plate unit. Admittedly in this arrangement it is important that the axial distance between the securing ring 59 and the end face of the bearing race ring 37f facing it is made so large that even after the friction linings of the clutch disc are completely worn, a necessary axial residual play is maintained. Admittedly for the case where the collar 43f according to FIG. 6 is part of the presser plate 17e, the maximum release travel of the presser plate 17e must also be calculated in with this axial distance.

Figure 8:
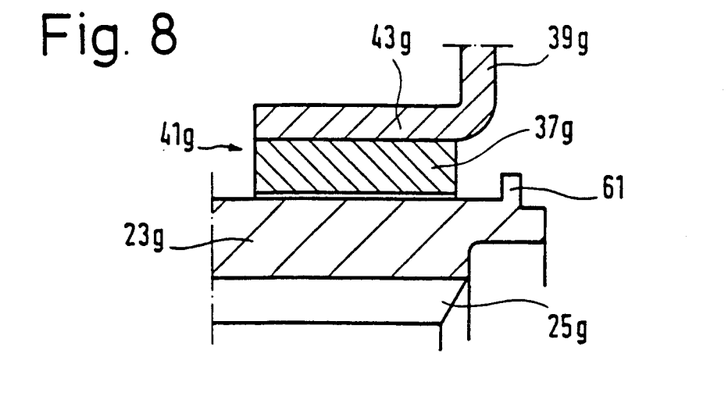

FIG. 8 shows a variant of FIG. 7, in that here a bead 61 which guarantees the axial securing is thrown up by plastic deformation on the hub 23g after introduction into the bearing 41g.

Figure 9:
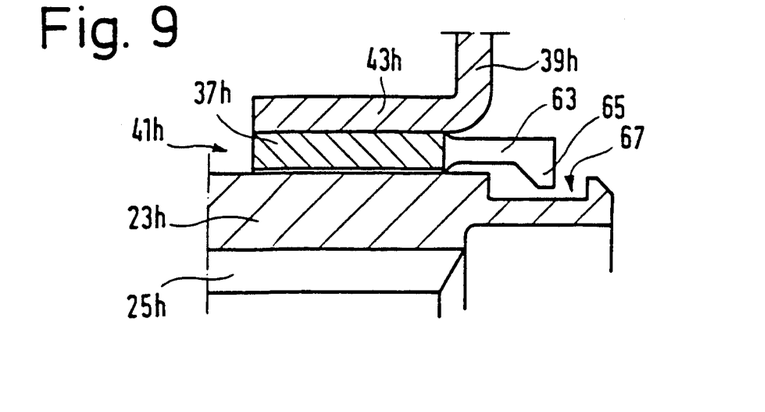

In FIG. 9 the bearing 41h is formed by the collar 43h and the hub 23h. also by a bearing ring 37h which consists preferably of synthetic plastics material and is provided, pointing away from the crank-shaft, with resilient prolongations 63 which each open into a radially inwardly directed nose 65. The noses 65 in operation engage in a radially outwardly open groove 67 which is arranged on the hub 23h. Due to the radial deformability of the bearing race ring 37h in the region of its noses 65 and due to appropriate bevels it is possible, in the introduction of the hub 23h into the internal opening of the bearing race ring 27h, to bring the axial holding device into the effective position by a snap effect. Thus a manipulation for fitting the axial fastening, necessary in this region of the pressure plate, is eliminated.

The axial securing according to FIGS. 7 to 9 renders it possible for the pressure plate unit and the clutch disc to be non-losably joined together as early as by the manufacturer, so that these parts can be delivered as a unit and can be fitted with a few manual actions as a unit on the fly-wheel of the completed internal combustion engine. Here from the outset there is a pre-centered position of the clutch disc for easy introduction of the gear shaft and its external splining.

Figure 10:
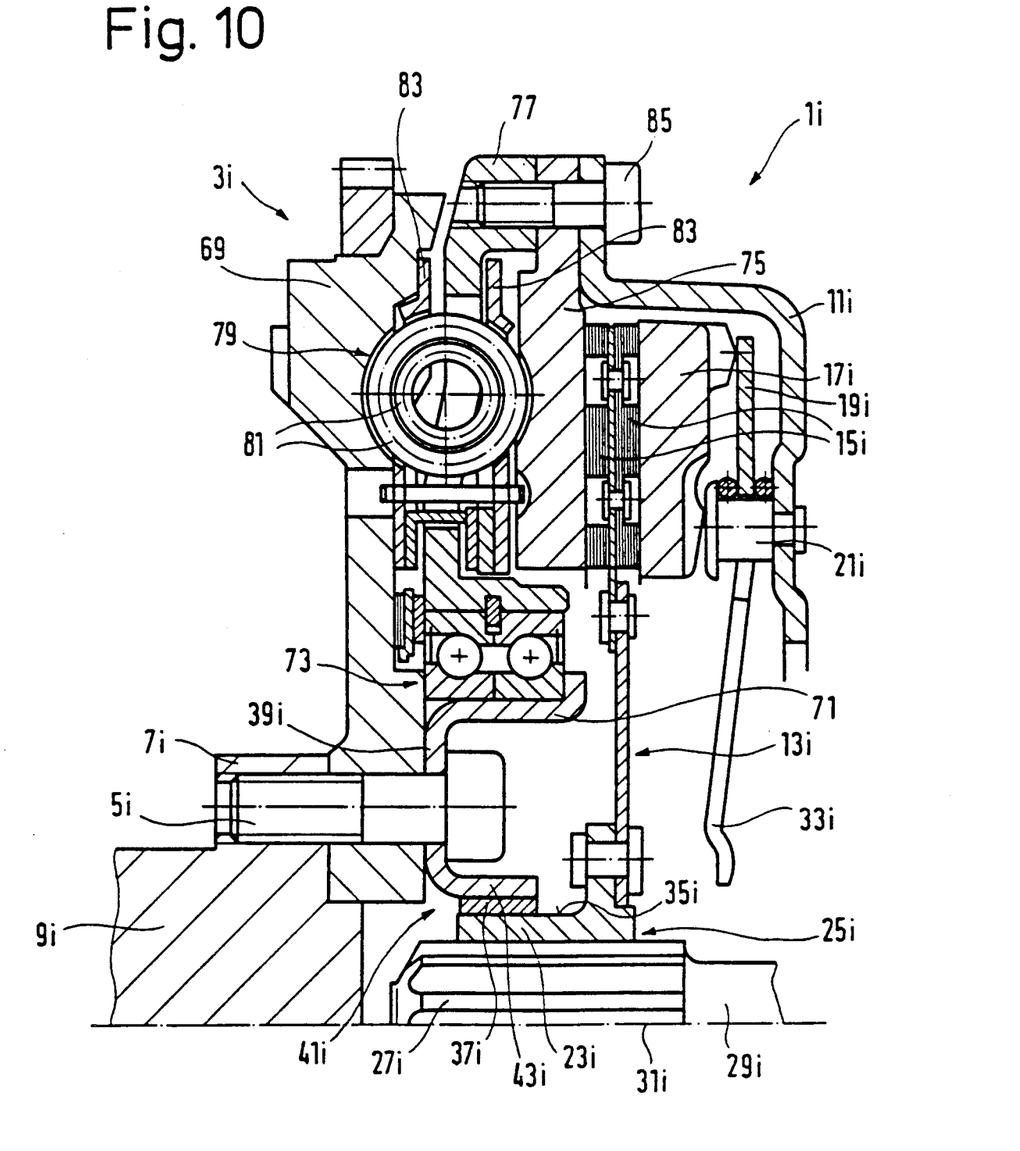
FIG. 10 shows a section through the upper half of a two-mass fly-wheel with mounting of the clutch disc.

In FIG. 10 it will be shown by reference to the upper half of a longitudinal section through a friction clutch 1i with a two-mass fly-wheel 3i, how the bearing mounting and centering of a clutch disc leads, under the circumstances existing here, to an advantageous solution. The two-mass fly-wheel 3i as represented here consists of a first fly-wheel 69 which is secured in a manner as described previously through a plurality of screws 5i arranged on a mean diameter on a flange 7i of a crank-shaft 9i. The screws 5i here at the same time hold a bearing plate 39i which is provided radially outside the screws 5i with a collar 71 facing away from the crank-shaft 9i. This collar 71 carries on its external circumference a bearing 73 on which a second fly-wheel 75 is mounted rotatably through a limited angle of rotation in relation to the first fly-wheel 69. The bearing 73 carries a hub disc 77 which is part of a torsion spring device 79. The torsion spring device 79 comprises several springs 81 distributed in the circumferential direction, which are arranged both in windows of the hub disc 77 and also in corresponding windows of side discs or cover plates 83 arranged on both sides of the hub disc 77. The two cover plates 83 are firmly connected with one another and at the same time fitted fast on the fly-wheel 69. The hub disc 77 extends in the radial direction out over the cover plates 83 and is firmly connected in this region through screws 85 with the second fly-wheel 75 on which the friction clutch 1i is arranged. Here all components rotatable by the bearing 73 about the rotation axis 31i pertain to the second rotation mass, while the first rotation mass is determined by the fly-wheel 69 and the components connected with it. The torsion spring device 79 can also comprise friction devices. In a manner already described the friction clutch 1i comprises the fly-wheel 75 as counter-presser plate, the presser plate 17i, the clutch cover 11i, the diaphragm spring 19i several distance bolts 21i arranged distributed in the circumferential direction on the cover 11*i* and the clutch disc 13*i* with a hub 23*i* and friction linings 15*i*. The hub 23*i* is arranged by means of its internal splining 25*i* fast in rotation but axially displaceably on the external splining 27*i* of the gear shaft 29*i* and is mounted and radially fixed in relation to the fly-wheel 69, The bearing 41*i* provided for this purpose for the one part comprises a collar 43*i* which is made in one piece with the bearing plate 39*i* and extends radially within the circle of arrangement of the screws 5*i* facing in the axial direction away from the crank-shaft 9*i*. In the interior of this collar 43*i* a bearing race ring 37*i* is arranged which is set upon the outer jacket 35*i* of the hub 23*i*. In this construction too the pilot bearing between gear shaft 29*i* and crank-shaft 9*i* can be eliminated and the clutch disc 13*i* 20 can be pre-fitted in the two-mass fly-wheel 3*i* before the fitting of the pressure plate unit.

Figure 11:
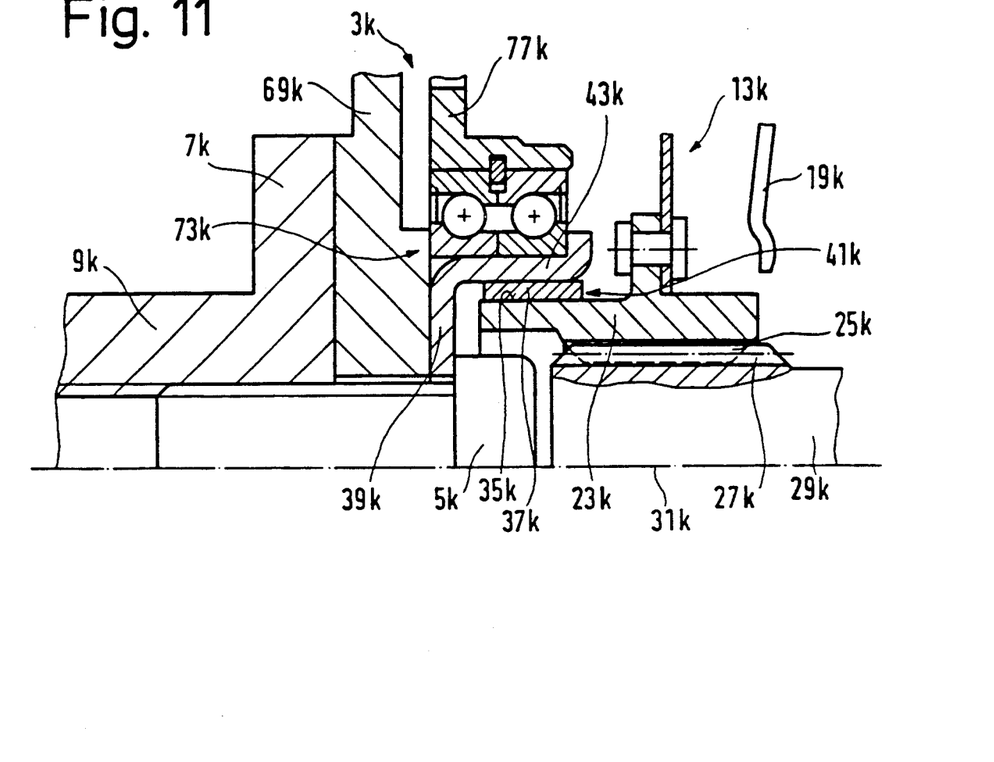
FIG. 11 shows a part section through another embodiment of a two-mass fly-wheel.

FIG. 11 shows by way of excerpt a variant of FIG. 10 in as much as in the two-mass fly-wheel 3*k* present here a central screw connection was effected between the first fly-wheel 69*k*, corresponding to the fly-wheel 69, and the crankshaft 9*k*, while the rotation-fast connection can be provided for example through a splining between the radially inner region of the fly-wheel 69*k* and the flange 7*k* of the crank-shaft 9*k*. The central screw connection through a screw element 5*k*, at the same time fastens a bearing plate 39*k* which carries, on the outer circumference of its axially extending collar 43*k*, the bearing 73*k* explained above for the second fly-wheel, held on a hub disc 77*k* of a torsion spring device, of a two-mass fly-wheel 3*k*. At the same time the inner surface of the collar 43*k* holds the bearing 41*k* for the mounting of the hub 23*k* of the clutch disc 13*k*. For this purpose the hub 23*k* is prolonged in the direction towards the crank-shaft 9*k* and provided with a bearing race ring 37*k* in the region extending concentrically with the collar 43*k*. This construction offers in addition to the advantages already discussed in connection with FIG. 10 an enormous saving of space in the radial direction due to the fact that it is possible to use a bearing 73*k* of smaller diameter, which moreover is cheaper than one with the larger diameter according to FIG. 10. The space gained in the radial direction is especially valuable, particularly in two-mass fly-wheels, since here much space is required for extensive torsion spring equipment and friction devices. For further explanation of the clutch moreover reference is made to the description of FIG. 10.

Figure 12:
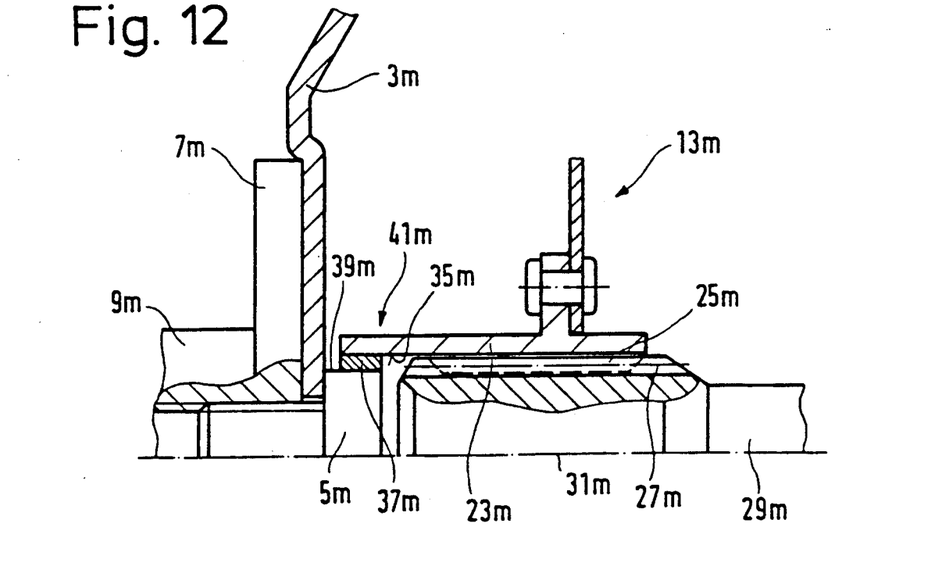
FIG. 12 shows a part section through a clutch with especially simple bearing mounting through a central screw element.

In FIG. 12 a partial longitudinal section is represented, the details of which can be used in a friction clutch either with single fly-wheel or with two-mass fly-wheel. The fly-wheel 3*m* is connected with the crank-shaft 9*m* through a central screw element 5*m*, which extends in the common rotation axis 31*m*. Here by way of example as shape-locking engagement between the flange 7*m* and the fly-wheel 3*m* a splining can be provided. The central screw element 5*m* has a head 39*m* with cylindrical outer jacket which, together with the hub 23*m* of the clutch disc 13*m*, which is made prolonged in the direction towards the crank-shaft 9*m*, with interposition of a bearing race ring 37*m*, forms the bearing 43*m* for the centring of the clutch disc 13*m*. This design makes a minimum of production expense suffice. At the same time the space requirement for the accommodation of the bearing 41*m* is minimal. Naturally it is possible to provide the screw element 5*m* with a larger head and to guide the prolonged hub 23*m* on an inner surface of a central opening of the head. In this case the space requirement in the radial direction is somewhat larger, but on the other hand a larger base area is present for the fastening of the fly-wheel 3*m* on the crank-shaft 9*m*.

While specific embodiments of the invention have been shown and described in detail to illustrate the application of the inventive principle, it will be understood that the invention may be embodied otherwise without departing from such principles.

What I claim is:

1. A friction clutch for arrangement in the drive line of a motor vehicle between a crank-shaft (9) which is rotatable about a rotation axis (31) and a gear shaft (29) coaxial with the crank-shaft (9), comprising a fly-wheel (3) securable by means of at least one securing element (5) on the crank-shaft (9), a clutch cover (11) held on the fly-wheel (3), a presser plate (17) arranged between the fly-wheel (3) and the clutch cover (11) and guided non-rotatably but axially movably on the clutch cover (11), a clutch disc (13) which comprises a hub (23) with an internal splining (25) for a non-rotatable but axially movable connection with the gear shaft (29) and friction linings (15) which can be clamped axially between the fly-wheel (3) and the presser plate (17), and a clutch main spring arrangement (19) provided with release elements (33), wherein said fly-wheel (3), securing element (5), clutch cover (11), and presser plate (17) each form a construction part of said friction clutch, the hub (23) of the clutch disc (13) is radially guided and centered by means of a bearing concentric with the rotation axis (31) separate from and independent of the gear shaft (29), on one of the construction parts (3; 5; 11; 17) of the friction clutch (1), and said gear shaft (29) has an end adjacent to and spaced from said crank-shaft (9) and said end is free of pilot bearing guidance, the bearing (41, a, i, k, m) is provided between the hub (23; a, i, k, m) and a bearing carrier (39, i, ki, m; 43a) held on the fly-wheel (3, a, i, k, m), the bearing carrier (39; 43a; 39i) is held on fly-wheel (3, a, i) by means of a plurality of fastening elements provided for the securing of the fly-wheel (3, a, i) on the crank-shaft (9, a.i) on a circle about the rotation axis (3, a, i), the fly-wheel (3i) is made as a two-mass fly-wheel and comprises a first fly-wheel (69) which is securable by means of the securing elements (5i) on the crank-shaft (9i) and a second fly-wheel (75) rotatable about the rotation axis (31i) in relation to the first fly-wheel (69), which second fly-wheel is rotationally elastically coupled with the first fly-wheel (69) through a torsion spring device (79), and wherein the bearing carrier (39i) comprises, radially within the circle of arrangement of the securing elements (5i), a collar (43i) protruding axially to the clutch disc (13i), on which collar the hub (23i) is mounted and merges radially outside the circle of arrangement into a bearing plate (71) on which the second fly-wheel (75) is guided.

2. A friction clutch for arrangement in the drive line of a motor vehicle between a crank-shaft (9) which is rotatable about a rotation axis (31) and a gear shaft (29) coaxial with the crank-shaft (9), comprising a fly-wheel (3) securable by means of at least one securing element (5) on the crank-shaft (9), a clutch cover (11) held on the fly-wheel (3), a presser plate (17) arranged between the fly-wheel (3) and the clutch cover (11) and guided non-rotatably but axially movably on the clutch cover (11), a clutch disc (13) which comprises a hub (23) with an internal splining (25) for a non-rotatable but axially movable connection with the gear shaft (29) and friction linings (15) which can be clamped axially between the fly-wheel (3) and the presser plate (17), and a clutch main spring arrangement (19) provided with release elements (33), wherein said fly-wheel (3), securing element (5), clutch cover (11), and presser plate (17) each form a construction part of said friction clutch, the hub (23) of the clutch disc (13) is radially guided and centered by means of a bearing concentric with the rotation axis (31) separate from and independent of the gear shaft (29), on one of the construction parts (3; 5; 11; 17) of the friction clutch (1), and said gear shaft (29) has an end adjacent to and spaced from said crank-shaft (9) and said end is free of pilot bearing guidance, the bearing (41, a, i, k, m) is provided between the hub (23; a, i, k, m) and a bearing carrier (39, i, ki, m; 43a) held on the fly-wheel (3, a, i, k, m), the fly-wheel (3k) is made as a two-mass fly-wheel, of which the first fly-wheel (69k) is securable on the crank-shaft (9k) by means of a screw element (5k) concentric with the rotation axis (31k), which element at the same time holds the bearing carrier (39k) on the first fly-wheel (69k), in that the bearing carrier (39k) comprises a collar (43k) concentric with the rotation axis (31k) and protruding axially to the clutch disc (13k), on the outer surface of which collar a second fly-wheel of the two-mass fly-wheel (3k), rotationally elastically coupled with the first fly-wheel (69k) through a torsional vibration damper (77k) and carrying the clutch cover, is limitedly rotatably mounted, and wherein the bearing (41k) radially guiding the hub (23k) is provided between the inner surface of the collar (43k) and an axial prolongation of the hub (23k).

3. A friction clutch for arrangement in the drive line of a motor vehicle between a crank-shaft (9) which is rotatable about a rotation axis (31) and a gear shaft (29) coaxial with the crank-shaft (9), comprising a fly-wheel (3) securable by means of at least one securing element (5) on the crank-shaft (9), a clutch cover (11) held on the fly-wheel (3), a presser plate (17) arranged between the fly-wheel (3) and the clutch cover (11) and guided non-rotatably but axially movably on the clutch cover (11), a clutch disc (13) which comprises a hub (23) with an internal splining (25) for a non-rotatable but axially movable connection with the gear shaft (29) and friction linings (15) which can be clamped axially between the fly-wheel (3) and the presser plate (17), and a clutch main spring arrangement (19) provided with release elements (33), wherein said fly-wheel (3), securing element (5), clutch cover (11), and presser plate (17) each form a construction part of said friction clutch, the hub (23) of the clutch disc (13) is radially guided and centered by means of a bearing concentric with the rotation axis (31) separate from and independent of the gear shaft (29), on one of the construction parts (3; 5; 11; 17) of the friction clutch (1), and said gear shaft (29) has an end adjacent to and spaced from said crank-shaft (9) and said end is free of pilot bearing guidance, the bearing (41b, c, d, f, g, h) is provided between the hub (23b, c, d, f, g, h) and a bearing carrier (39c, d, f, g, h; 43b) held on the clutch cover (11b, c, d, f, g, h).

4. A friction clutch according to claim 3, wherein the presser plate (17b) penetrates the clutch cover (11b) axially at a plurality of points distributed in the circumferential direction, in that at least the release elements (33b) of the clutch main spring arrangement (19b) are arranged on the side of the clutch cover (11b) axially remote from the fly-wheel (3b) and wherein the bearing carrier (43b) is formed integrally on the clutch cover (11b).

5. A friction clutch according to claim 3, wherein at least the release elements (33c, d) of the cluth main spring arrangment (19c, d) are secured on the clutch cover (11c, d) with several support elements (21e, d) distributed in the circumferential direction and wherein the support elements (21c, d) at the same time hold the bearing carrier (38c, d) axially between the clutch cover (11c, d) and the presser plate (17c, d) on the clutch cover (11c, d).

6. A friction clutch for arrangement in the drive line of a motor vehicle between a crank-shaft (9) which is rotatable about a rotation axis (31) and a gear shaft (29) coaxial with the crank-shaft (9), comprising a fly-wheel (3) securable by means of at least one securing element (5) on the crank-shaft (9), a clutch cover (11) held on the fly-wheel (3), a presser plate (17) arranged between the fly-wheel (3) and the clutch cover (11) and guided non-rotatably but axially movably on the clutch cover (11), a clutch disc (13) which comprises a hub (23) with an internal splining (25) for a non-rotatable but axially movable connection with the gear shaft (29) and friction linings (15) which can be clamped axially between the fly-wheel (3) and the presser plate (17), and a clutch main spring arrangement (19) provided with release elements (33), wherein said fly-wheel (3), securing element (5), clutch cover (11), and presser plate (17) each form a construction part of said friction clutch, the hub (23) of the clutch disc (13) is radially guided and centered by means of a bearing concentric with the rotation axis (31) separate from and independent of the gear shaft (29), on one of the construction parts (3; 5; 11; 17) of the friction clutch (1), and said gear shaft (29) has an end adjacent to and spaced from said crank-shaft (9) and said end is free of pilot bearing guidance, the bearing (41e, f, g, h) is provided between the hub (23e, f, g, h) and a bearing carrier (39f, g, h; 43e) held on the presser plate (17e).

7. A friction clutch for arrangement in the drive line of a motor vehicle between a crank-shaft (9) which is rotatable about a rotation axis (31) and a gear shaft (29) coaxial with the crank-shaft (9), comprising a fly-wheel (3) securable by means of at least one securing element (5) on the crank-shaft (9), a clutch cover (11) held on the fly-wheel (3), a presser plate (17) arranged between the fly-wheel (3) and the clutch cover (11) and guided non-rotatably but axially movably on the clutch cover (11), a clutch disc (13) which comprises a hub (23) with an internal splining (25) for a non-rotatable but axially movable connection with the gear shaft (29) and friction linings (15) which can be clamped axially between the fly-wheel (3) and the presser plate (17), and a clutch main spring arrangement (19) provided with release elements (33), wherein said fly-wheel (3), securing element (5), clutch cover (11), and presser plate (17) each form a construction part of said friction clutch, the hub (23) of the clutch disc (13) is radially guided and centered by means of a bearing concentric with the rotation axis (31) separate from and independent of the gear shaft (29), on one of the construction parts (3; 5; 11; 17) of the friction clutch (1), and said gear shaft (29) has an end adjacent to and spaced from said crank-shaft (9) and said end is free of pilot bearing guidance, the bearing (41) is provided between the hub (23) and a bearing carrier (39) held on the said one construction part (3; 5; 11; 17) of the friction clutch (1) and wherein the bearing carrier (39) comprises an axially protruding collar (43) annularly enclosing the hub (23), in which collar a bearing race ring (37) guiding the hub (23) is arranged.

8. A friction clutch according to claim 7, wherein the bearing carrier (39f, g, h) is held on the clutch cover (11b, c, d) or on the presser plate (17e), wherein the hub (23f, g, h) axially penetrates the collar (43f, g, h) and wherein on the side of the collar (43f, g, h) remote from the fly-wheel (3b, c, d, e) there are provided arresting elements (59; 61; 63;, 65, 67) which fix the hub (23f, g, h) in relation to the bearing carrier (39f, g, h) with an axial play which is at least equal to the wear distance of the friction linings (15b, c, d) or the clearance distance of the presser plate (17e).

9. A friction clutch according to claim 8, wherein the bearing race ring (37h) secured to the bearing carrier (39h) carries, on the side axially remote from the fly-wheel (3b, c, d, e), axially protruding elastic tongues (63) with radially inwardly pointing noses (65), and wherein the hub (23h) comprises a radially outwardly open circumferential groove (67), into which the noses (65) can snap for arresting.

* * * * *